(12) United States Patent
Rahman

(10) Patent No.: US 11,990,943 B2
(45) Date of Patent: May 21, 2024

(54) SYSTEM AND METHOD FOR QUANTUM-ENABLED CYBER SECURITY IN A WIRELESS MOBILE NETWORK

(71) Applicant: AT&T Intellectual Property I, L.P., Atlanta, GA (US)

(72) Inventor: Moshiur Rahman, Marlboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 652 days.

(21) Appl. No.: 17/140,542

(22) Filed: Jan. 4, 2021

(65) Prior Publication Data
US 2022/0216924 A1    Jul. 7, 2022

(51) Int. Cl.
| | | |
|---|---|---|
| *H04B 10/70* | (2013.01) | |
| *G06N 10/00* | (2022.01) | |
| *H04L 9/40* | (2022.01) | |
| *H04W 12/122* | (2021.01) | |

(52) U.S. Cl.
CPC ............. *H04B 10/70* (2013.01); *G06N 10/00* (2019.01); *H04L 63/1408* (2013.01); *H04L 63/16* (2013.01); *H04L 63/18* (2013.01); *H04W 12/122* (2021.01); *H04L 63/20* (2013.01)

(58) Field of Classification Search
CPC ... H04L 63/14–1491; H04L 63/16–168; H04L 63/18; H04L 63/20–205; G06N 10/00; H04B 10/70; H04W 12/12–122
See application file for complete search history.

(56) References Cited

U.S. PATENT DOCUMENTS

| | | |
|---|---|---|
| 8,381,298 B2 | 2/2013 | Blumfield et al. |
| 2007/0076878 A1 | 4/2007 | Kuang |
| 2016/0380765 A1 | 12/2016 | Hughes et al. |
| 2018/0013556 A1 | 1/2018 | Saavedra |
| 2019/0013950 A1 | 1/2019 | Becker et al. |
| 2019/0260581 A1 | 8/2019 | Su et al. |
| 2020/0119987 A1 | 4/2020 | Griffin et al. |

(Continued)

OTHER PUBLICATIONS

"WLAN Security: Threats and Countermeasures", International Journal on Informatics Visualization; vol. 2 (2018) No. 4, 2018, 7 pages.

(Continued)

*Primary Examiner* — Madhuri R Herzog
(74) *Attorney, Agent, or Firm* — Guntin & Gust, PLC; Mark Wilinski

(57) ABSTRACT

Aspects of the subject disclosure may include, for example, monitoring a security status of a wireless communication session comprising a back-haul link supporting a classical communication channel between a wireless access point and a wireless mobility core network. The classical communication channel is adapted to transport underlying data of the wireless communication session and, responsive to determining a change in the security status, associating with the wireless communication session a quantum communication channel adapted to transport information via qubits. Information is exchanged between the wireless access point and the mobility core network via the qubits of the quantum communication channel, wherein the exchanging of the information via the qubits enhances a security level of the wireless communication session in view of a perceived threat. Other embodiments are disclosed.

20 Claims, 9 Drawing Sheets

(56) References Cited

U.S. PATENT DOCUMENTS

2020/0389299 A1* 12/2020 White .................... H04B 10/85
2022/0174095 A1*  6/2022 Rahman ................ H04L 9/0852
2023/0188544 A1*  6/2023 Hunt ................... H04L 63/1416
                                                               726/23

OTHER PUBLICATIONS

Marinho, Jose et al., "A survey on security attacks and counter-measures with primary user detection in cognitive radio networks", EURASIP Journal on Information Security (2015) 2015:4, DOI 10.1186/s13635-015-0021-0, 2015, 14 pages.

Wassim, El-Hajj et al., "Survey of Security Issues in Cognitive Radio Networks", Journal of Internet Technology vol. 12 (2011) No. 2, Mar. 10, 2011, 18 pages.

\* cited by examiner

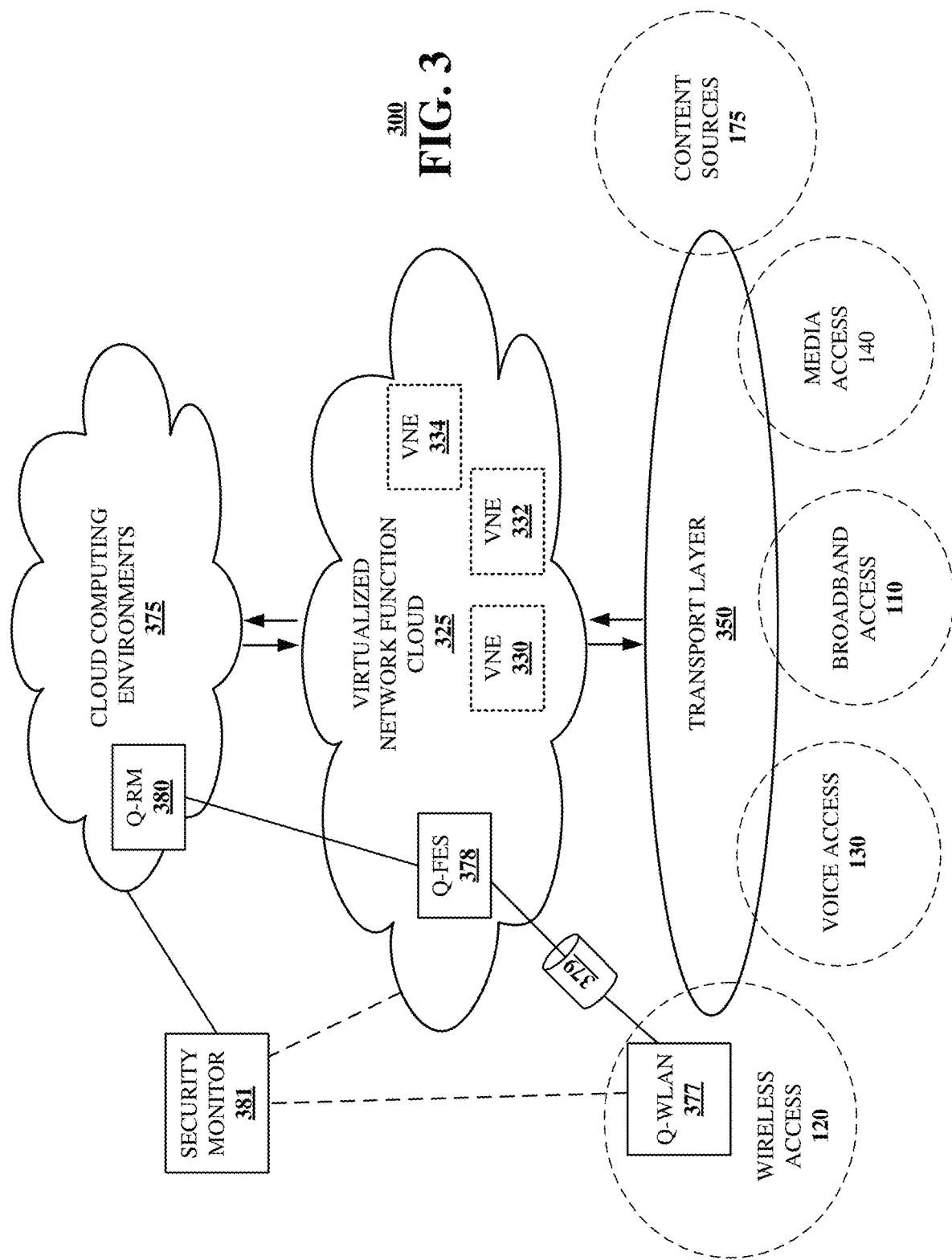

SYSTEM AND METHOD FOR QUANTUM-ENABLED CYBER SECURITY IN A WIRELESS MOBILE NETWORK

FIELD OF THE DISCLOSURE

The subject disclosure relates to a system and method for quantum-enabled cyber security in a wireless mobile network.

BACKGROUND

Quantum teleportation relates to a process whereby quantum information may be transported from one location to another according to a quantum mechanical state of a particle, such as a photon. The quantum state refers to a state encoded onto a property of the particle, sometimes referred to as a quantum observable. For example, the property can include one of a polarization, a wavelength or an emission time. More specifically, pairs of entangled particles, such as photons are created and sending one of each pair to different recipients. The photons may be transmitted in free space, or in a guided manner, e.g., via a waveguide, such as an optical fiber. The encoded photons, or qubits, are directed toward a receiver adapted to analyze the quantum bits to detect the encoded information. Whatever happens to one spin influences the other instantaneously, in a predictable manner without regard to their distance of separation. If a first recipient allows one of the entangled particles to interact with a memory qubit that holds the information to be exchanged, the interaction changes the state of the photon. Through quantum entanglement, the state of the entangled photon at the second recipient changes instantaneously. Such quantum teleportation also requires that information relating to the quantum states be shared between remote entities via a classical communication channel. The quantum state information, together with the observable quantum properties, may be used to exchange information in a secure manner.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
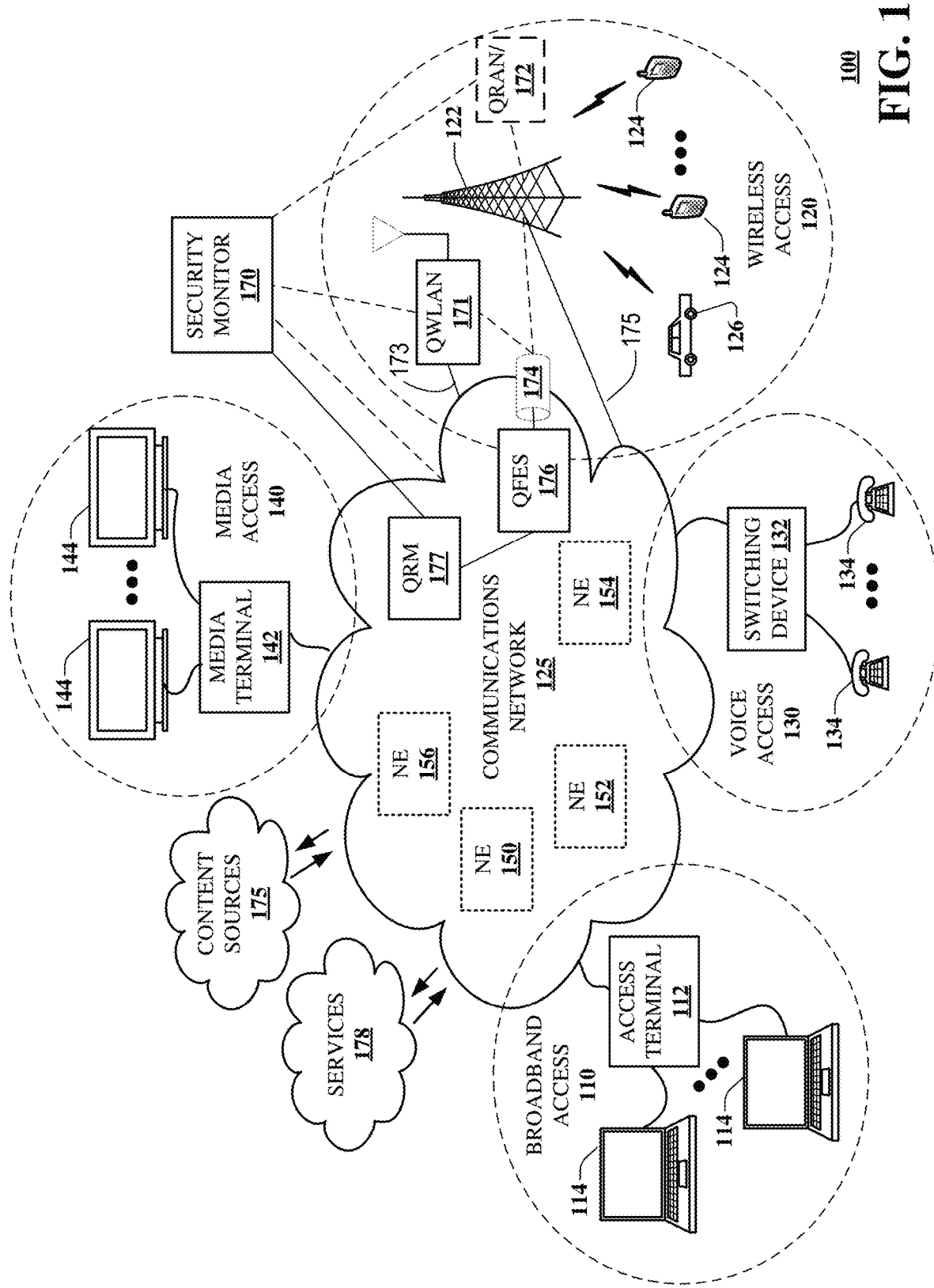
FIG. 1 is a block diagram illustrating an exemplary, non-limiting embodiment of a communications network in accordance with various aspects described herein.

The subject disclosure describes, among other things, illustrative embodiments for establishing a quantum channel between a wireless access point and a mobile core network responsive to a perceived security threat, and securing at least a portion of a mobile backhaul communications channel between the wireless access point and the mobile core network according to an exchange of quantum entangled particles via the quantum channel. Other embodiments are described in the subject disclosure.

One or more aspects of the subject disclosure include a system that includes a processing system having a processor and a memory. The memory stores executable instructions that, when executed by the processing system, facilitate performance of operations. The operations include monitoring a security status of a mobile communication session comprising a back-haul link between a wireless access point and a mobility core network. The back-haul link includes a classical communication channel adapted to transport underlying data of the mobile communication session between the wireless access point and the mobility core network. Responsive to determining a change in the security status indicating a perceived threat, a quantum communication channel adapted to transport information via qubits is provisioned between the wireless access point and the mobility core network. Information is exchanged between the wireless access point and the mobility core network via the qubits of the quantum communication channel, wherein the exchanging of the information via the qubits enhances a security level of the mobile communication session to obtain an enhanced security level in view of the perceived threat.

One or more aspects of the subject disclosure include a process, that includes monitoring, by a processing system including a processor, a security status of a wireless communication session. The wireless communication session relies upon a back-haul link between a wireless access point and a mobility core network. The back-haul link includes a classical communication channel adapted to transport underlying data of the wireless communication session between the wireless access point and the mobility core network. Responsive to determining a change in the security status indicating a perceived threat, a quantum communication channel is initiated, by the processing system, between the wireless access point and the mobility core network. The quantum communication channel is adapted to transport information via qubits. Information is exchanged, by the processing system, between the wireless access point and the mobility core network via the qubits of the quantum communication channel, wherein the exchanging of the information via the qubits enhances a security level of the wireless communication session to obtain an enhanced security level in view of the perceived threat.

One or more aspects of the subject disclosure include a machine-readable medium, that includes executable instructions that, when executed by a processing system including a processor, facilitate performance of operations. The operations include monitoring a security status of a wireless communication session including a back-haul link between a wireless access point and a mobility core network. The back-haul link includes a classical communication channel adapted to transport underlying data of the wireless communication session between the wireless access point and the mobility core network. Responsive to determining a change in the security status indicating a perceived threat, a quantum communication channel is associated with the wireless communication session between the wireless access point and the mobility core network. The quantum communication channel is adapted to transport information via qubits. Information is exchanged between the wireless access point and the mobility core network via the qubits of the quantum communication channel, wherein the exchanging of the information via the qubits enhances a security level of the wireless communication session to obtain an enhanced security level in view of the perceived threat.

A potential security threat to a mobile communication network may be discovered through a threat detection mechanism, such as automated malware quarantine (AMQ), IoT scanner or any other suitable techniques. User data services of one or more mobile users may be transitioned to a secure quantum-enabled communication channel, on-demand. The quantum-enabled communication channel may extend between a network cloud and one or more wireless access points (WAP), such as wireless local area network (WLAN) hot-spots, to heighten security for Wi-Fi connected mobile devices and/or mobile cellular access terminals, or base stations, to heighten security for 4G and/or 5G connected mobile devices.

The quantum-enabled communication channels may be provisioned upon demand, e.g., in response to detection of potential security threats. Similarly, the quantum-enabled communication channels may be deprovisioned once a communication session has terminated, and/or responsive to a particular application and/or service of an active communication session having been terminated, and/or responsive to a handoff of the associated mobile device to a neighboring cell. In at least some embodiments, a status of a provisioning and/or current use of a quantum-enabled channel may be shared between one or more neighboring cells, including small cells, microcells and femtocells and between one or more nearby WAPs and/or one or more neighboring cells to facilitate handover events. In some embodiments, one or more quantum-enabled channels may be provisioned and/or pre-provisioned in anticipation of a potential handover of a mobile communication session engaged in a communication session relying upon a quantum-enabled channel. It is understood that in at least some instances, despite there being a detected security threat, such provisioning and/or pre-provisioning, e.g., based on potential hand-over events, may not be necessary based on one or more of the nature of the security threat, infrastructure differences of backhaul links and the like.

It is further understood that quantum-enabled communication channels require specialized infrastructure adapted to process information according to quantum states of particles. Such quantum-aware devices and/or systems, e.g., quantum computers, generally impose stringent requirements associated with the generation, storage and/or processing of such quantum particles, as discussed in more detail below. In at least some embodiments the quantum-aware systems, such as a quantum-aware WLAN base station may be in safe and appropriate accommodating location, such as enterprise corporate sites, airports, and large dual units. With the current approach, after the threat has been detected and contained, a software solution, for example, AMQ, automatically allows the device to rejoin the network risking the same threat again. The ability to add such heightened security, e.g., hardening, on demand allows active communication sessions to proceed, despite the perceived and/or actual confirmed security breach or threat. The disclosed techniques providing a quantum-enabled communication channel on demand, offer improvements over current security solutions, such as better threat proof added security for the highly sensitive content users or mission critical systems.

In at least some embodiments, supporting infrastructure facilitates quantum-enabled adaptations to mobile communication networks, which allow end users to migrate over a quantum secure connection on demand by employing at least three quantum-enabled systems or nodes. By way of nonlimiting example, a first node may include a quantum-enabled WLAN (Q-WLAN) through which a wireless user may be attached, e.g., at an active Wi-Fi hotspot. A second node may include a Quantum Front End Server (Q-FES) at a central site, such as at core cloud, e.g., a mobility core network. A third node may include a Quantum Resource Manager (Q-RM), e.g., at and/or otherwise associated with the core cloud.

Having detected a security breach for a mobile user through any suitable security detection and/or threat assessment technique, a traditional or classical software defined network (SDN) may be adapted to add, acquire, and/or otherwise association and/or outsource quantum security tasks to a quantum entity. For example, an SDN controller or orchestrator may, after having detected a potential threat, request such quantum-aware functionality via the Q-RM. The Q-RM, in turn, may facilitate a suitable quantum-enabled channel to address and/or otherwise counter the perceived security threat. For example, the Q-RM may associate, configure, re-configure and/or otherwise activate quantum-enabled infrastructure, such as the Q-WLAN and/or the Q-FES, to provision and/or otherwise enable the quantum-enabled communication channel. It is understood that the proposed quantum-channel on-demand features may be applied to one or more specific implementations, such as 5G, in which a required sequence of the solution may involve messaging between one or more of the aforementioned three quantum touch points.

It is believed that the disclosed quantum-channel on-demand features, at least as they relate to mobile, e.g., 5G, cyber security, do not exist today. The ability to establish a quantum-channel on-demand enables mobile end users, including IoT type devices that may or may not be mobile, to migrate to a quantum secure connection on demand, e.g., by employing the aforementioned three quantum touch-points: Q-WLAN, Q-RM, and Q-FES, at least for SDN applications. The ability to provision and/or otherwise establish and/or activate a quantum-channel on-demand is distinguishable from current approaches, which may isolate and contain communication infrastructure after the threat is detected. For example, the AMQ type solutions allow an affected device to rejoin the network, thereby risking a subsequent security breach. Such solutions fail to provide other alternatives, such as the enhanced level of security offered by quantum-enabled communication channels. Moreover, it has been observed that currently available security solutions are generally difficult to deploy, manage, program, scale, and/or secure.

Contrary to the disclosed techniques, which may apply threat mitigation policies according to services and applications, currently available solutions often rely on security threat mitigation policies that are tightly coupled to physical resources. Such physical resource dependence hinders security solutions, which may struggle to provide quick and automated threat mitigation across equipment from multiple vendors. Furthermore consistent security policies that are tightly coupled to physical resources are difficult to administer across compute, storage, and network domains, and multiple data centers.

By implementing a quantum-enabled channel on-demand, e.g., active communication sessions and/or services may proceed with heightened security, without necessitating that they automatically rejoin the network without such quantum-aware provisions that would otherwise risk a recurrence of any threat. Rather, the disclosed techniques mitigate threats by migrating at least a portion of the underlying session communications to a quantum secure path, which may be under a joint control of a classical SDN and a Q-RM.

Referring now to FIG. 1, a block diagram is shown illustrating an example, non-limiting embodiment of a system 100 in accordance with various aspects described herein. For example, system 100 can facilitate in whole or in part, a provisioning, an establishment and/or an activation of a quantum-enabled communication channel between a wireless access point and a mobile core network responsive to a perceived security threat, and securing mobile backhaul communications according to an exchange of quantum entangled particles via the quantum channel. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. The wireless access point may be in communication with the communications network 125 via a backhaul network or backhaul link 182. In at least some embodiments, the communications network 125 provides communication access to wireless devices that may or may not be mobile, such as drones and/or appliances, e.g., home appliances, security systems, and the like. Wireless communications access may include, without limitation machine-to-machine or machine-type communications, e.g., according to Internet of Things (IoT) applications. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In at least some embodiments, the system 100 includes a security monitor 170 and one or more quantum-aware devices or systems 171, 172, 176. For example, the system 100 may include a quantum-aware wireless access point, such as a quantum-aware wireless local area network (Q-WLAN) 171. The Q-WLAN 171 may include a radio adapted to support wireless communications and a quantum processor adapted to support one or more quantum processes. The Q-WAP wireless communications may be implemented according to a wireless communication protocol, such as a wireless local area network (WLAN) protocol. Example WLAN protocols include any of these generally known to those skilled in the art, including the examples disclosed herein, such as any of the IEEE 802.11 protocols, e.g., Wi-Fi, or Bluetooth. In at least some embodiments, the Q-WLAN 171 may include a classical network interface, such as a network interface card, e.g., an Ethernet interface, adapted to connect to a classical communications channel, such as a classical communications backhaul channel 173 between the Q-WLAN 171 and an edge device of a mobility core network of the communications network 125. The Q-WLAN 171 is also in communication with the quantum channel 174.

Alternatively or in addition, the access terminal 122 may include a quantum-aware radio access network (Q-RAN) terminal 172 (shown in phantom). The Q-RAN terminal 172 may include one or more radios adapted to support wireless mobile communications along with a quantum processor adapted to support one or more quantum processes. In at least some embodiments, the Q-RAN terminal 172 includes a quantum-aware base station and/or quantum-aware radio controller. The wireless mobile communications may be implemented according to one or more wireless mobile communication protocols, such as any of the example wireless mobility protocols disclosed herein or otherwise generally known to those skilled in the art. Example wireless mobility protocols include, without limitation, one or more of the example 3GPP LTE protocols, e.g., sometimes referred to generally as 3G, 4G, 5G and 6G. In at least some embodiments, the Q-RAN terminal 172 may include a classical network interface, such as a network interface card, e.g., an Ethernet interface, adapted to connect to a classical communications channel, such as a classical communications backhaul channel 175 between the Q-RAN terminal 172 and an edge device of a mobility core network of the communications network 125. The Q-RAN terminal 172 is also in communication with the quantum channel 174.

In at least some embodiments, backhaul communications of an active mobile communication session, e.g., providing one or more of mobile devices 124, 126 with access to backend services, may be secured according to one or more quantum processes, such as the exchange of qubits via the quantum channel 174. Quantum processes may include, without limitation, one or more of any of the quantum processes disclosed herein, such as generation of qubits, generation of quantum entangled particles or qubits, transmission and/or receipt of qubits and/or quantum entangled particles or qubits, entanglement swapping, quantum teleportation, sensing of quantum states, evaluation of qubit values, detection of tampering by evaluation of quantum states, quantum key distribution (QKD), storage of entangled particles and/or qubits, quantum processing of qubits, e.g., according to quantum gates, and the like. A qubit is quantum mechanical analogue of a classical bit embodied in one or more of ions, electrons, and/or photons.

In at least some embodiments, the communications network 125 includes one or more quantum-aware devices, such as a quantum frontend server (Q-FES) 176. The Q-FES 176 includes a quantum processor adapted to support one or more quantum processes, as well as a traditional processing system, e.g., running an operating system, such as UNIX®, a registered trademark of X/Open Co. Ltd., Corp. of Berkshire, England, or Windows®, a registered trademark of Microsoft Corp., of Seattle, WA, and/or Apple® iOS, a registered trademark of Apple Corp. of Cupertino, CA. The Q-FES 176 is in communication with one or more of the classical communications backend links 173, 175. The Q-FES 176 is also in communication with the quantum channel 173.

In at least some embodiments, the Q-FES 176 is in communication with one or more servers providing access to backend services. The servers may be local, e.g., providing services offered by a network service provider of the mobility core network and/or the communications network 125. Alternatively or in addition, the services may be available from third party services 178, such as streaming media services, e.g., Pandora®, a registered trademark of Pandora Media, LLC, of Oakland CA, and Netflix®, a registered trademark of Netflix, Inc., of Los Gatos, CA. Other services may include, without limitation, web-browsing, instant messaging, video chat, VoIP, teleconferencing, security monitoring, social media, such as Facebook®, a registered trademark of Facebook, Inc. of Menlo Park, CA, Twitter®, a registered trademark of Twitter, Inc., of San Francisco, CA, TikTok®, a registered trademark of Bytedance Ltd. of Grand Cayman, Cayman Islands, and so on.

The system 100 may include a quantum resource manager Q-RM 177. The Q-RM 177 is in communication with the Q-FES 176 and is adapted to facilitate association of the quantum channel with one or more of the backhaul links 173, 175. Presently, quantum processes are complex, requiring access to one or more of specialized quantum processors, quantum storage devices, quantum channels, and the like. Presently, quantum processes, such as quantum internet, quantum communications, quantum teleportation and quantum processing are somewhat limited in bandwidth, or qubit capacity, such that access to such quantum processes may be reserved for special applications, e.g., requiring heightened security, special users, e.g., privileged users, and/or special situations, e.g., perceived security breaches. Accordingly, the Q-RM 177 may facilitate quantum-enabled backhaul communications according to an on-demand and/or as-needed basis. It us understood that in at least some embodiments, the Q-RM 177 may facilitate transition or reversion from quantum-enabled backhaul communications to traditional classical communications, e.g., via one or more of the backhaul links 173, 175. Such reversions from quantum-enabled links to classical links may be provided according to an on-demand and/or as-needed basis. Examples include, without limitation, situations in which a heightened security status is no longer necessary, upon an expiration of time, in response to an event, such as alleviation of any perceived security breach that may have initiated quantum access, and so on.

For embodiments, in which the Q-RM 177, the Q-WLAN 171 and/or the Q-RAN 172 are engaged in a selective manner, they may operate under the control of another device, such as a quantum controller. The quantum controller may be in communication with one or more of the Q-RM 177, the Q-WLAN 171 and/or the Q-RAN 172, providing an indication, such as a control signal, to indicate when quantum processes should be engaged and/or disengaged, e.g., facilitating a controlled access to the quantum channel 174. The quantum controller may initiate such control signals responsive to an event, such as a user action, e.g., at a user interface, and/or a monitored event, such as an environmental event and/or a timer or clock encountering an activation/deactivation time. Alternatively or in addition, the quantum controller may determine the indication, i.e., control signal according to logic. The logic may be adapted to provide the control signal according to a logical processing of one or more of user inputs, environmental sensors, timers, clocks, signals from other devices, systems and/or services, such as security monitors, and the like.

According to the illustrative embodiment, the quantum controller comprises a security monitor 170. The security monitor may be adapted to assess a security status related to one or more active mobile communication sessions. By way of example, and without limitation, the security monitor 170 may receive indications from environmental monitors, e.g., motion sensors, security cameras, door latch actuators, ID card scanners, and the like, to identify potential threats as they may relate to unauthorized access to physical spaces, such as equipment cabinets, equipment racks, communication facilities, and the like, associated with a backhaul link 173, 175 of the active mobile communication session. Presuming a potential security threat is detected, the security monitor 170 provides a signal to one or more of the Q-FES 176, the Q-WLAN 171, and the Q-RAN 172. The signal may be selectively directed to the particular devices associated with a backhaul link associated with the potential security threat.

Alternatively or in addition perceived security threats may be determined according to a monitoring of network communications, link status, error rates, packet delays, signal levels, signal loss, and the like. Such monitoring may be provided by standalone monitoring equipment, e.g., positioned along one or more of the backhaul links 173, 175, at one or more of the Q-FES 176, the Q-WLAN 171, and the Q-RAN 172, by one or more of the network elements 150, 152, 153, 156, from a remote system or service 178, such as a security monitoring service. In at least some embodiments, a potential threat may be determined according to an application hosted on one or more of the backend servers of the services 178, backend servers of the communications network 125, and/or the Q-FES 176, the Q-WLAN 171, and the Q-RAN 172, and/or the mobile devices 124, 126.

The Q-FES 176, the Q-WLAN 171, and the Q-RAN 172 may be operable responsive to a signal from the security monitor 170 to engage and/or disengage the quantum processes with one or more active communication sessions utilizing one or more of the backhaul links 173, 175.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
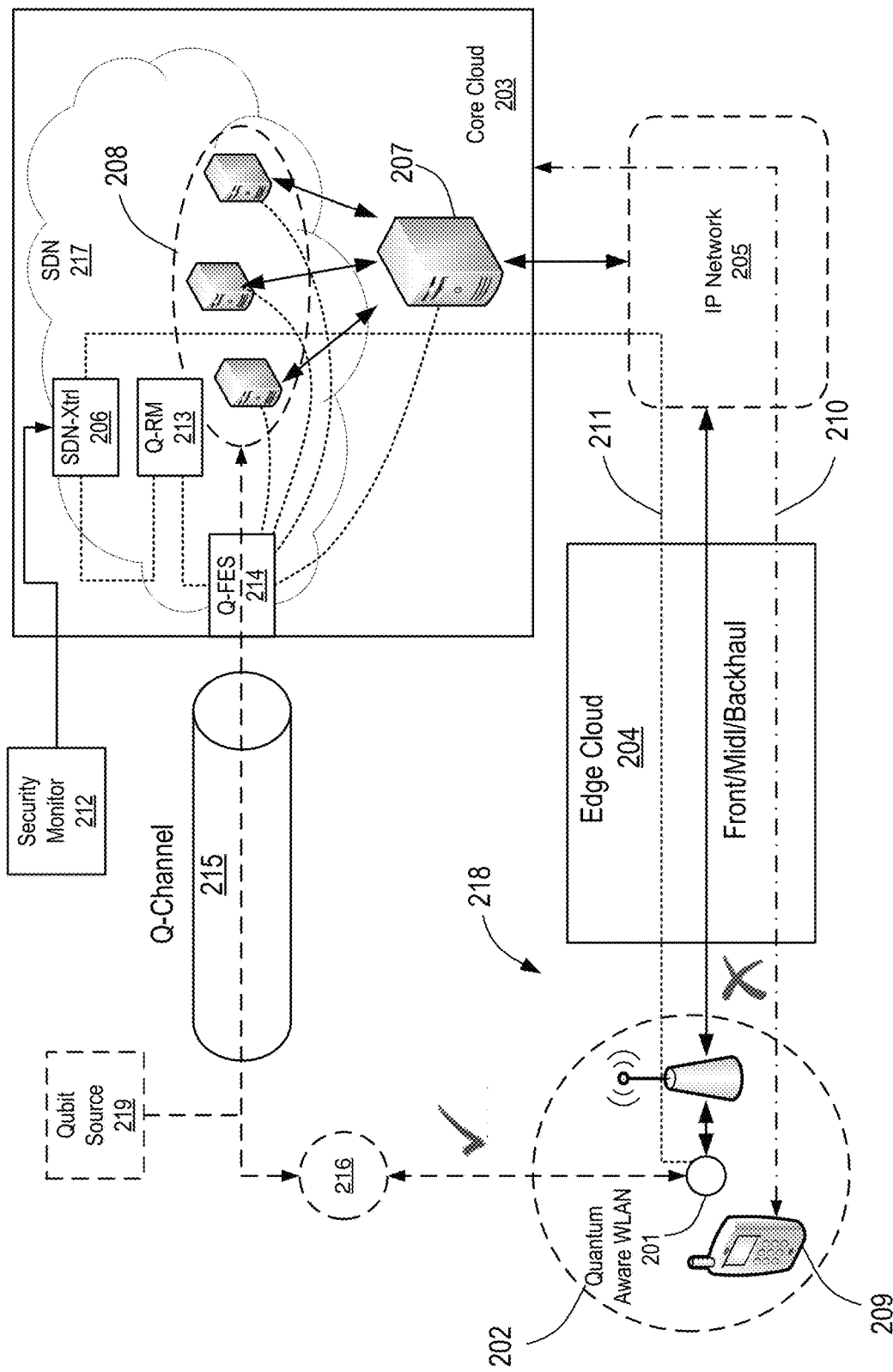
FIG. 2A is a block diagram illustrating an example, non-limiting embodiment of a quantum-enabled system functioning within the communication network of FIG. 1 in accordance with various aspects described herein.

FIG. 2A is a block diagram illustrating an example, non-limiting embodiment of a quantum-enabled system 200 functioning within the communication network of FIG. 1 in accordance with various aspects described herein. The system 200 include a quantum-aware WLAN (Q-WLAN) 201 providing wireless service to a mobile communication device 209 within a wireless access region 202. The mobile communication device 209 may be engaged in an active communication session in which the device 209 engages one or more services via one or more remote systems. For example, the services may be provided by and/or otherwise accessed through one or more backend servers 208 at a mobile network provider's core network. The example core network includes a core cloud network 203 that may include, be implemented and/or otherwise adapted according to a software defined network (SDN) 217. The SDN 217 includes an SDN orchestrator and/or controller 206 adapted to configure one or more core cloud network resources 203 to facilitate delivery of mobile services to the mobile communication device 209.

The Q-WLAN 201 is in communication with the core cloud 203 via a backhaul communications channel 218. The example backhaul communication channel 218 facilitates communications between the Q-WLAN 201, the mobile communication device 209 and the core cloud 203. According to the illustrative example, the backhaul channel 218 includes an edge server 207 of the core cloud 203. Underlying data exchanged via the backhaul communications channel 218 may include user data 211, e.g., associated with one or more applications and/or services accessed by the mobile communications device 209. For example, the edge server 207 is in further communication with one or more backend servers 208 adapted to deliver and/or otherwise support services available to the mobile communications device 209. User data may include, without limitation, Web queries, file transfers, text messaging, email communications, social media, streaming audio and/or streaming video, and the like. Alternatively or in addition, the underlying data exchanged via the backhaul communications channel 218 may include control and/or signaling data 210, e.g., associated with discovery, attachment, and/or mobility of the mobile communications device 209.

In more detail, the backhaul communications channel 218 may include an edge cloud 204, facilitating one or more of a front portion, a mid-portion and/or a backhaul portion of the backhaul communications channel 218. The edge cloud 204 may be a private edge cloud, e.g., installed, maintained, leased and/or otherwise managed by a network service provider. Alternatively or in addition, the edge cloud 204 and/or another portion of the backhaul communications channel 218 may include publicly accessible infrastructure, not necessarily under the control or management of the network service provider. For example, at least a portion of the backhaul communications channel 218 may include an IP network 205, such as the Internet (shown in phantom). It is understood that securing against perceived threats over any portion of the backhaul communications channel 218 that requires securing physical access to communications infrastructure may prove exceedingly difficult.

The system 200 includes three main quantum-aware systems, subsystems, or nodes, sometimes referred to as quantum "touch points." Namely, the system 200 includes a Q-RM 213, a Q-FES 214, and Q-WLAN 201. The system 200, by way of the quantum-aware touchpoints 102, 213, 214, allows mobile end users, including IoT wireless devices, which may or may not be mobile, to migrate communications to a quantum secured connection, on demand. According to the illustrative example, the system 200 includes a quantum channel 215 between the Q-WLAN 201 and the Q-FES 214. The quantum channel 215 is adapted to transport quantum information, e.g., in the form of quantum particles, qubits, quantum states, and the like. According to the illustrative example, the quantum channel 215 comprises an optical link adapted to convey photons, wherein the quantum information is conveyed through one or more physical properties of the photons. Physical properties of the photons may include, without limitation, polarization and/or angular momentum, including angular orbital momentum. The optical link may include, without limitation, an optical waveguide, such as an optical fiber cable, and/or a free-space optical link.

The quantum communications channel 215 may be established responsive to a perceived security threat. For example, the mobile communications device 209 may be engaged in a communications session, e.g., accessing services via one or more of the backend servers 208 via a classical communications channel supported by the backhaul communications channel 218. The example system 200 includes a security monitor 212 adapted to detect a potential security threat. The security monitor 212, upon detecting a potential security threat, may provide an indication of the perceived threat to the SDN controller 206. The SDN controller 206, in turn, may evaluate the perceived threat alone or in combination with one or more of an identity and/or type of the mobile communications device 209, an identify of a user of the mobile communications device 209, an active service engaged by the mobile communications device 209, a quantum capability of the active wireless access point and/or quantum capabilities of other wireless access points that may be capable of providing overlapping coverage to the mobile communications device 209.

In at least some embodiments, the optical link may include one or more quantum repeaters 216. The quantum repeaters 216 are adapted to extend a usable range of the optical link as may be particularly useful for optical fiber cable embodiments, in which currently achievable ranges are from about 60 to about 120 miles. It is understood that free-space optical links may not be limited, with reported examples permitting quantum-enabled satellite communications links. Quantum repeaters 216 may include a quantum receiver, a qubit regenerator, and a quantum transmitter to effectively establish two independent quantum-enabled channels between the Q-WLAN 201 and the Q-FES 214. In such instances, the quantum repeaters 216 are provided in a physically secure location to guard against security threats. Alternatively or in addition, the quantum repeaters 216 may employ a quantum process referred to as entanglement swapping, in which security of the quantum communications channel 215 is assured without necessarily requiring physical security at the quantum repeater 216, or along the fiber and/or free-space link. It is understood that qubits, by their nature, are immune to unauthorized access without the system 200 becoming aware of such access, e.g., by a disruption to the quantum properties, such as a collapse of a quantum entangled state.

In at least some embodiments qubits, e.g., the photons, are generated and/or otherwise sourced locally at one or more of the Q-FES 214 and the Q-WLAN 201. Alternatively or in addition, the qubits, e.g., the photons, may be generated and/or otherwise sourced from a remote entity, such as the example qubit source 219. For example, the qubit source 219 may generate entangled photons, e.g., having orthogonal polarization states, and transmit a first one of the entangled pair to the Q-FES 214 and a second one of the entangled pair to the Q-WLAN 201. The qubits, by their quantum states, may facilitate a quantum-enabled exchange of information between the Q-FES 214 and the Q-WLAN 201. In at least some embodiments, the exchange of quantum-enable information may be in one direction, e.g., from the Q-FES 214 to the Q-WLAN 201. Alternatively or in addition, the exchange of quantum-enabled information may be in both directions. Such bi-directional exchanges of quantum-enabled information may occur in a simplex fashion. Alternatively or in addition, they may occur in a full-duplex fashion.

By way of illustrative example, the SDN 217 may be notified about a change in security status, such as a possible security breach. For example, the SDN 217 receives an indication of a possible security breach from the security monitor 212. In at least some embodiments, the SDN 217 determines the nature of the threat and determines the remedy based on the pre-defined logic. For example, the SDN controller 206 receives an indication of a possible security breach. The SDN controller 206 may evaluate the nature of the breach to determine if there is a possibility that the breach may pose a security threat the mobile communication device 209 and/or any applications and/or services with which the mobile communication device 209 is actively utilizing.

For example, the security monitor 212 may provide one or more details related to the breach. Such details may include, without limitation, identification of physical locations, e.g., buildings, equipment rooms, utility poles, network devices, communication links, e.g., which backhaul link 218 and/or which wireless access point may be associated with the breach. The SDN controller 206 may include logic that is adapted to process information obtained from the security monitor 212 alone and/or in combination with information available from the SDN 217, such as identification of a configuration of the associated core cloud 203, and/or identification of an associated edge server 207 and/or identification of associated backend servers 208 and/or identification of wireless access point, and so on. The logic may be adapted to identify a potentially affected mobile device, and/or a wireless access point and/or a backhaul link. Alternatively or in addition logic may be adapted to assess a level of the potential security threat to support a determine as to whether a quantum channel is necessary. It is understood that certain users, and/or applications may be more sensitive to a security breach than others, such that a limited quantum resource, such as the quantum channel 215 may be selectively provisioned and/or otherwise activated in some situations, while not being activated in others that may not be as sensitive to the security breach.

In at least some embodiments, the SDN 217, e.g., the SDN controller 206, obtains an identification and/or a physical location and/or a network location, e.g., an IP address, of the Q-WLAN 201 serving the affected mobile device 209. Physical locations, e.g., geocoordinates and/or addresses, may be obtained from a location reported by a GPS receiver of the mobile device, and/or a pre-determined location of the Q-WLAN 201. The SDN controller 206 may identify which backhaul link 218 is being used for the particular Q-WLAN 201 and determine whether a separately reported security breach may impact one or more of the Q-WLAN and/or the backhaul link 218.

To the extent the SDN, e.g., the SDN controller 206, determines that quantum-enabled communications should be applied to the particular backhaul link 218, the SDN controller 206 may outsource a quantum-enabled solution to a quantum network infrastructure. According to the illustrative embodiment, the SDN controller 206 may engage the Q-RM 213 to facilitate establishment of a quantum-enabled solution, e.g., a quantum security treatment. In at least some embodiments, the Q-RM 213 maintains a mapping table of quantum resources, such as entanglement generators 219, Q-FES 214, Q-WLAN 201, quantum repeaters 216, quantum links 215, and the like. Alternatively or in addition, the Q-RM 213 is adapted to determine availabilities and/or capabilities of any such quantum resources. For example, the Q-RM 213 may be adapted to determine a capacity of quantum node pairs, such as those pairs as may be available to and/or at the Q-WLAN 201 and/or the core Q-FES 214, that have backend services and/or application mapping. The Q-RM 213, in turn, is adapted to facilitate establishment of a quantum-enabled communication channel 215 between the Q-WLAN 201 servicing the affected mobile device 209 and the Q-FES 214.

The Q-RM 213 may facilitate the quantum-enabled communication channel over a satellite communication link, and/or over a the optical fiber communications link and/or over a free-space link, or any other physical link suitable for transporting entangled qubits, while also preserving their quantum states. The physical infrastructure supporting the exchange of qubits may be the same infrastructure supporting the affected backhaul, e.g., the same optical fiber. Alternatively or in addition, the physical infrastructure supporting the exchange of qubits may be separate from the affected backhaul link 218.

The Q-RM 213 may notify the SDN, e.g., the SDN controller 206, regarding completion of a provisioning and/or activation of the quantum-enabled communication channel 215. Upon receiving an indication from the Q-RM 213 that the quantum-enabled communication channel 215 has been provisioned and/or otherwise made available for use, SDN, e.g., the SDN controller 206, instructs one or more of the core edge server 207 and/or the edge cloud 204, e.g., a 5G edge cloud, to transition and/or otherwise switch and/or modify the backhaul communications to transition the user channel to the core cloud 203 via the Q-WLAN 201. The Q-WLAN 201 may resume the user session with the core cloud network 203 by leveraging security of the qubits over the quantum-enabled link 215 to the user session. It is understood that, without limitation, leveraging the qubits may include implementing a quantum key distribution over the quantum channel 215 to establish a secure encryption key that may be applied to user session communications over the classical communication channel, e.g., over the existing backhaul link 218.

Alternatively or in addition, leveraging the qubits may include implementing quantum internet, e.g., utilizing quantum teleportation of quantum states over the quantum channel 215 to convey underlying data associated with the user session communications. It is understood that in the latter example in which the quantum channel 215 is adapted to convey the underlying user data, a corresponding classical communication channel may be necessary through which quantum state information may be shared between the Q-WLAN 201 and the Q-FES 214. The classical communications channel may utilize the same satellite, and/or optical fiber, and/or free space optical link supporting the quantum channel 215. Alternatively or in addition, the classical communications channel may utilize the same communication link, e.g., the original backhaul link 218, that was breached. The quantum-enabled configuration, once established, may remain in place until one or more of the Q-WLAN 201 and/or the Q-FES and/or the Q-RM 213 is instructed otherwise, e.g., by the SDN controller 206, which may occur over the classical edge cloud 204.

Figure 2B:
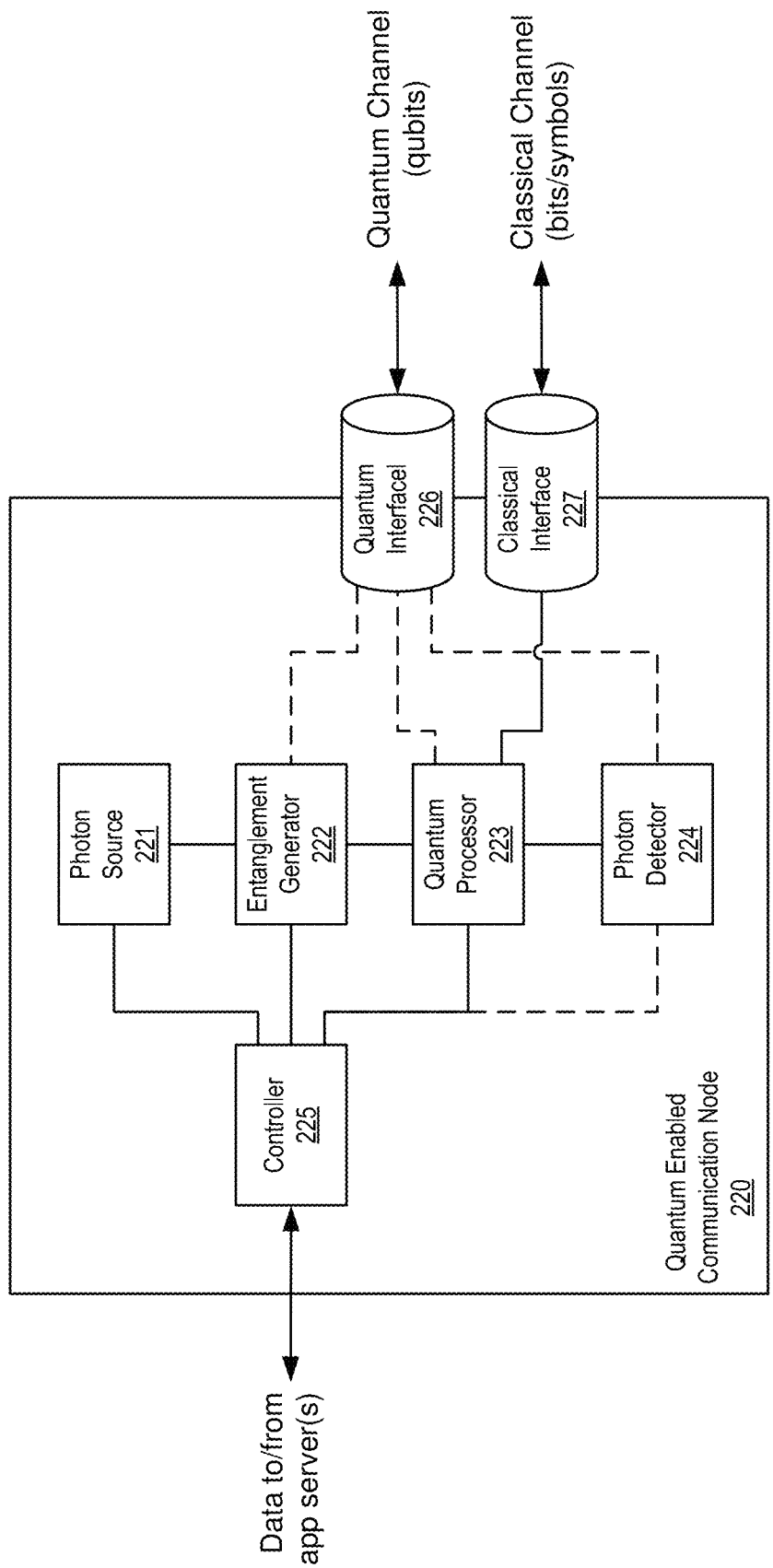
FIG. 2B is a block diagram illustrating an example, non-limiting embodiment of a quantum-enabled communication node functioning within the quantum-enabled system of FIG. 2A and the communication network of FIG. 1.

FIG. 2B is a block diagram illustrating an example, non-limiting embodiment of a quantum-enabled communication node 220 functioning within the quantum-enabled system of FIG. 2A and the communication network of FIG. 1. For example, the quantum-enabled communication node 220 may be associated with and/or incorporated into one or more of the Q-FES 176, 214, the Q-WLAN 171, the Q-WLAN 201 and the Q-RAN 172 (FIGS. 1 and 2A). The example quantum-enabled communication node 220 includes a photon source 221, an entanglement generator 222, a quantum processor 223 and a photon detector 224. The quantum-enabled communication node 220 also includes a quantum node controller 225 in communication with one or more of the photon source 221, the entanglement generator 222, the quantum processor 223 and the photon detector 224.

The photon source 221 can include without limitation, source of photons. Optical sources can include, without limitation, coherent devices, such as lasers or masers, non-coherent devices, such as light emitting diodes (LEDs), and combinations thereof. Lasers can include solid state lasers, e.g., semiconductor diode lasers, gas lasers, chemical lasers fiber lasers, photonic crystal lasers, and so on. Although the term optical source is used, it is understood that devices may operate within and/or without a visible light region of the spectrum, e.g., within the infrared and/or ultraviolet spectra. In at least some embodiments, optical source devices can include millimeter wave and/or microwave devices, e.g., masers, and the like.

In at least some embodiments photons produced by the photon source 221 are coherent, e.g., produced by a laser. The laser can include a pump source to produce energetic coherent photons having an energy above a predetermined minimum threshold. For example, the predetermined minimum threshold level of the energetic photons can be determined according to a predetermined classical optical channel, e.g., such that the energetic photons maintain a minimum energy level after passage through the classical optical channel. In at least some embodiments, the minimum energy level can be determined according to one or more of a photon detector sensitivity, a path loss of the classical optical channel, a noise threshold, a quantum analyzer sensitivity, and the like. In some embodiments, the photon source 221 provides individual photons. Alternatively or in addition, the photon source 221 provides multiple photons, e.g., providing a group of multiple photons according to a single request received from the quantum node controller 225.

In at least some embodiments, the photon source 221 can generate photons having characteristics suitable for an intended application. For example, the photon source 221 can generate photons having a wavelength adapted for telecommunication applications. By way of non-limiting example, the photon wavelengths can be one or more of 850, 1300 and 1550 nm for optical fiber channel applications.

Within the framework of quantum communications over long distances, photons at so-called "telecom" wavelengths have naturally come to the forefront as ideal support for quantum information because of their very weak interaction with the environment and of the low losses on propagation in standard optical fibers. Telecom wavelengths are defined by the International Telecommunications Union (ITU) in the form of standardized frequency bands (for example O, E, S, C, L, U). However, although very low, the transmission losses set a limit beyond which communication is no longer possible since the rate of detected photons becomes lower than the noise rate in the detector which remains the main limitation of the signal-to-noise ratio.

In at least some embodiments, the entanglement generator 222 includes a quantum state adjustor and/or selector. A source for emitting entangled photons, such as the entanglement generator 222, emits pairs of photons correlated on one of their quantum observables. Stated otherwise, the quantum state of each of the photons taken individually cannot be defined. For example, the entanglement generator 222 may receive photons from the photon source 221, split the photons using a nonlinear crystal, exhibiting spontaneous parametric down-conversion to obtain entangled photon pairs. The entangled photons may be processed within the entanglement generator 222 and/or the quantum processor 223 to obtain entangled photons. By way of nonlimiting example, the processing may include filtering the photons according to different, e.g., orthogonal filters to selectively obtain entangled photons having a preferred polarization.

Alternatively or in addition, the entangled photons may be adapted according to their angular orbital momentum. Devices adapted for altering an orbital angular momentum include, without limitation, spiral phase plates. Spiral phase plates, or mirrors, can include spiral-shaped pieces of crystal and/or plastic that are engineered specifically to a predetermined topological charge and incident wavelength. Adjustable spiral phase plates can be made by providing an adjustable separation, e.g., by moving a wedge between two sides of a split or cracked piece of plastic. It is envisioned that other devices can be used to produce vortices of a photon or photon beam, such as a hologram, a deformable mirror, a birefringent liquid crystal plate, sometimes referred to as a q-plate. For example, a q-plate with a topological charge "q" can generate a ±2q charge vortex in an optical beam based on polarization of an input beam. Applications of orbital angular momentum devices, including modulators and demodulators and/or detectors are disclosed in U.S. patent application Ser. No. 16/211,809, entitled "Free-Space, Twisted Light Optical Communication System," filed on Dec. 6, 2018, the entire teachings of which are incorporated herein by reference in its entirety.

The orbital angular momentum of light refers to a component of angular momentum of a light beam or photon that is dependent on a field spatial distribution, and not on a polarization. High-order orbital angular momentum is a quantum mechanical state, one of the few that can be observed at the macroscopic level. It has become an attractive branch of studied due one its most intensely examined phenomena, Optical Vortices (OVs), which has found numerous applications, including; the ability to spin microscopic objects (known as an optical tweezer), create new forms of imaging systems, and behaves within nonlinear materials to give new insights into quantum optics.

In an optical vortex, otherwise known as "twisted light" or "topological charge", light is twisted like a corkscrew around its axis of travel. Because of the twisting, the light waves at the axis itself cancel each other out. When projected onto a flat surface, an optical vortex looks like a ring of light, with a dark hole in the center. This corkscrew of light, with darkness at the center, is called an optical vortex.

In some embodiments, the entanglement generator 222 provides one or more of the entangled photons for application to a source endpoint of a quantum teleportation system, e.g., a quantum transmitter, a destination endpoint of a quantum teleportation system, e.g., a quantum receiver or detector, and/or a quantum relay or repeater. Alternatively or in addition, the entanglement generator 222 provides one or both qubits of an entangled photon pair to a storage device. The quantum particles may be transported over a quantum channel via a quantum channel interface 226. classical information, e.g., identifying an observed quantum state may be conveyed to one or more communication nodes, e.g., the Q-WLAN and/or the Q-FES over a classical channel, via a classical channel interface 227. Data may be exchanged between the quantum-enabled communication node 220 and one or more external devices, such as the mobile communications device 209, and/or the backend servers 208.

The quantum node controller 225 may be adapted to implement one or more instructions and/or rules that initiate generation of entangled photon pairs or qubits having a predetermined label or tag value impressed on the photon, e.g., by way of a photon's orbital angular momentum. The generated qubits can be used as generated and/or stored in a storage element for later retrieval. It is understood that in at least some embodiments, one or more of the quantum-enabled communication node 220 and/or the separate qubit source 219 (FIG. 2) may develop a reservoir or pool of tagged or labeled qubits that can be stored and retrieved on an as needed basis.

Although the system elements of the example entangled photon provisioning system 200 are presented in a particular order, it is understood that the ordering of one or more of the system elements can be changed. For example, photon may be tagged and/or otherwise modified according to an identification label, e.g., a number. Such tagged photons may be arranged after the entanglement generator 222 to tag the entangled photon pairs. Alternatively or in addition, a photon tagger may be arranged after the controller 225 to tag the entangled photons and/or entangled photon pairs retrieved from the storage element.

It is understood that energy injected into a quantum system can disrupt a fragile entangled photon pair relationship. Furthermore, reading a quantum particle in a state of superposition will collapse the superposition. For these reasons, a traditional approach of photon amplification used in optical fiber networks is not suitable for entangled photons that are in a state of superposition. To amplify a regular photon, one combines it with another light pulse of a higher intensity, their combined intensity if an average of the original constituents. But they have to be separated so that the original photon stream regains data coherence. Therefore, traditional amplification processes would disrupt quantum entanglement, and the separation of the combined light pulse would act like a measurement and shatter the superposition. This can be overcome by using an entanglement swapping strategy. The disclosed photon creation process supports a practical scalability, providing both high performance and increased efficiency, by providing substantially pure photon "blanks" upon which to generate entangled pairs as disclosed in U.S. patent application Ser. No. 16/426, 891, entitled "System and Method for Provisioning of Entangled-Photon Pairs," filed on May 30, 2019, the entire teachings of which are incorporated herein by reference in its entirety.

Figure 2C:
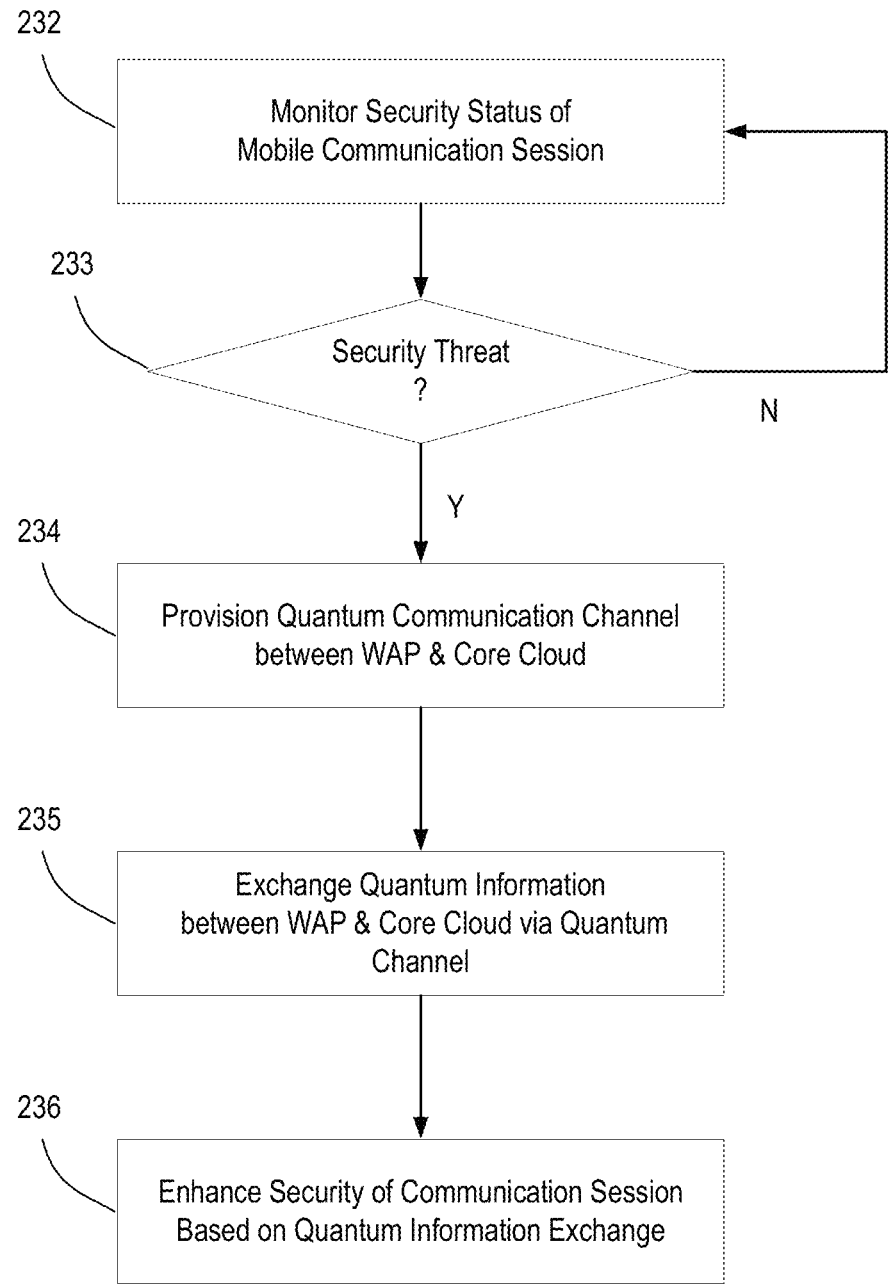
FIG. 2C depicts an illustrative embodiment of a process in accordance with various aspects described herein.

FIG. 2C depicts an illustrative embodiment of a process 230 in accordance with various aspects described herein. According to the example process 230, a security status of mobile communication session is monitored at 232, and a determination is made at 233 as to whether a security threat may exist. For example, a security monitor 170, 212 (FIGS. 1, 2A) monitors a security status of a communications session and/or a backhaul communications link 173, 175, 218 (FIGS. 1, 2A). To the extent it is determined that no security threat exists, the process 230 continues monitoring at 232 and assessing potential security threats at 233. Monitoring of the potential security threats may include implementing logic at SDN controller 206 responsive to an indication from the security monitor 170, 212. The logic may determine that an indication from the security monitory in one instance may necessitate utilizing a quantum-enabled communications channel, while in another instance, communications may continue according to a classical communications channel, without utilizing quantum information.

To the extent it is determined at 233 that a potential security threat exists, a quantum communication channel is provisioned at 234. Provisioning of the quantum communication channel may include the SDN controller 206 notifying the Q-RM 213 (FIG. 2) that a quantum communication channel is required. The Q-RM 213 may determine whether a suitable quantum communication channel has already been established, e.g., between the Q-WLAN 201 and the Q-FES 214, in which instance, provisioning may include simply allocating at least a portion of the qubits to a communication session 209 of the mobile device 209. Alternatively or in addition, the Q-RM 213 may determine that a suitable quantum communication does not exist and that one is necessary. In such instances, the Q-RM 213 may identify available quantum resources, such as one or more of the Q-WLAN 201, the Q-FES 214, the qubit source 219, the quantum repeater 216 and a physical layer of the quantum communication channel 215. The Q-RM 213 orchestrates establishment of the quantum communication channel and informs the SDN controller 206 once the quantum communications channel has been provisioned.

The SDN controller 206, in turn, may notify one or more of the edge server 207, the edge cloud 204, the Q-WLAN 201 and the Q-FES 214 to initiate a transition from a mobile device 209 user session relying upon classical communications to a similar user session relying upon a quantum-enabled session according to the quantum communication channel. Quantum information may then be exchanged at 235 between one or more of the Q-FES 176, the Q-WLAN 171, and the Q-RAN 172, via the quantum channel 174, 215. A security level of the communication session is enhanced at 236 according to the exchange of quantum information via the quantum channel.

Figure 2D:
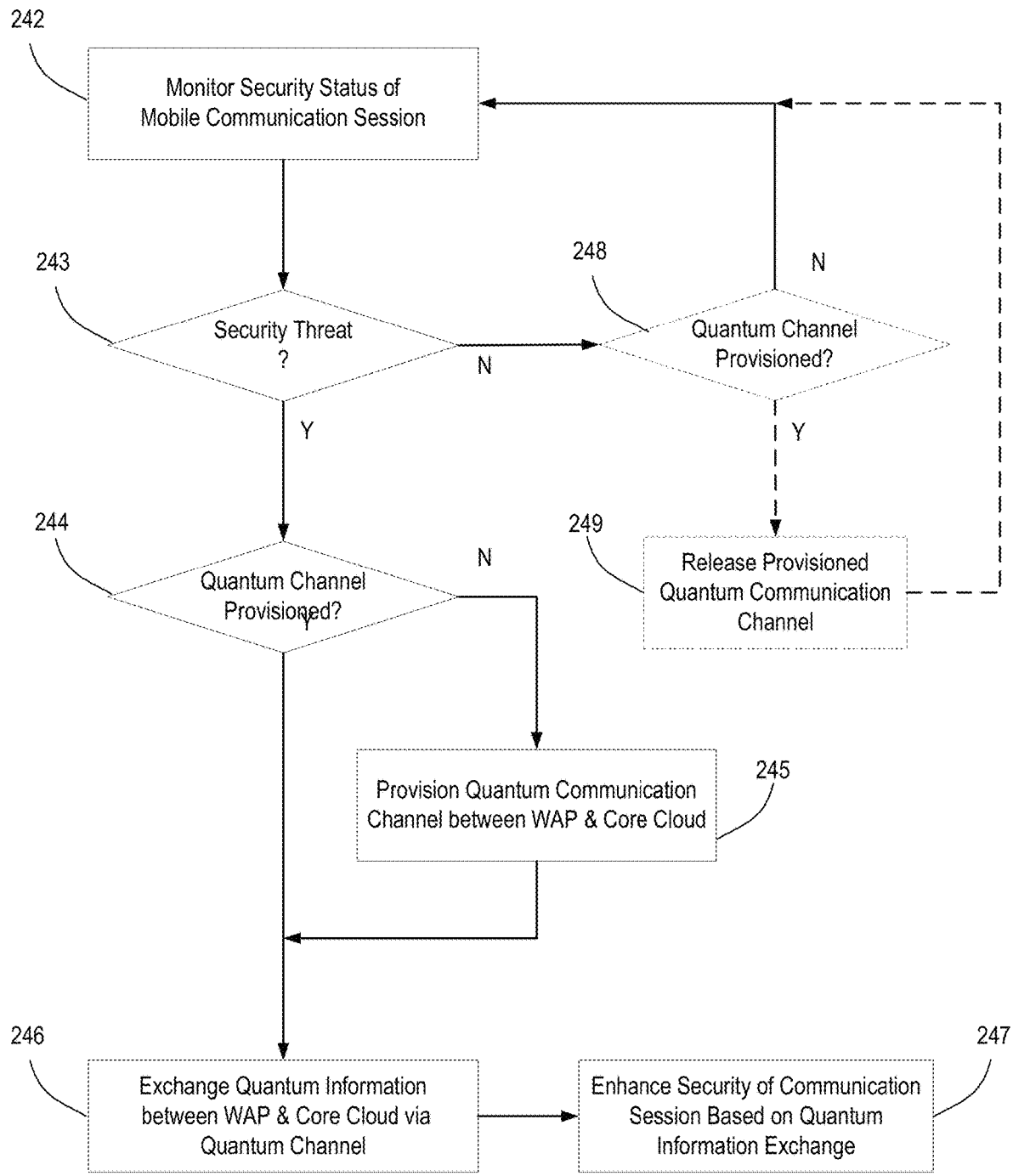
FIG. 2D depicts an illustrative embodiment of another process in accordance with various aspects described herein.

FIG. 2D depicts an illustrative embodiment of another process 240 in accordance with various aspects described herein. According to the example process 240, a security status of mobile communication session is monitored at 242. A determination is made at 243 as to whether a security threat may exist. To the extent it is determined that no security threat exists, the process 240 continues monitoring at 242 and assessing potential security threats at 243. To the extent it is determined at 243 that a potential security threat exists, it is determined at 244 whether a quantum channel has already been provisioned. To the extent it is determined at 244 that a quantum channel has not yet been provisioned, the quantum communication channel is provisioned at 245. Once it has been determined that the quantum channel has been provisioned, information is exchanged at 246 between one or more of the Q-FES 176, the Q-WLAN 171 and the Q-RAN 172, via the quantum channel 174 (FIG. 1). A security level of the communication session is enhanced at 247 according to the exchange of quantum information via the quantum channel.

In some embodiments, the process 240 optionally determines whether a quantum channel has been provisioned at 248 (shown in phantom). This determination may be performed responsive to a security threat not having been determined and/or otherwise detected at 243. To the extent a quantum channel is currently provisioned, the quantum channel may be optionally released and/or otherwise disassociated and/or deactivated at 249 (shown in phantom). After having released the provisioned quantum channel at 249, the process 240 continues monitoring the security status at 242. Likewise, to the extent it is determined that a quantum channel has not been provisioned at 248, the process 240 also continues monitoring the security status at 242. According to the illustrative process, q quantum communication may be provisioned responsive to a detected security threat and, in at least some embodiments, released and/or otherwise decommissioned responsive to a subsequent lack of a security threat.

While for purposes of simplicity of explanation, the respective processes are shown and described as a series of blocks in FIGS. 2C and 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of the system 200, the communication node 220 and the processes 230, 240 presented in FIGS. 1, 2A, 2B, 2C, 2D and 3. For example, the virtualized communication network 300 may facilitate in whole or in part, a provisioning, an establishment and/or an activation of a quantum-enabled communication channel between a wireless access point and a mobile core network responsive to a perceived security threat, and securing mobile backhaul communications according to an exchange of quantum entangled particles via the quantum channel.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

The example virtualized communication network 300 includes a quantum-aware substrate adapted to perform computational and/or communication functions based at least in part upon quantum mechanical principles. According to the quantum-aware substrate, the wireless access 120 network element may one or more quantum-aware wireless access points and/or quantum-aware radio access networks. According to the illustrative example, the wireless access 120 include a Q-WLAN 377. Similarly, the virtualized network function cloud 325 may include one or more quantum-aware network elements. According to the illustrative example, the virtualized network function cloud 325 includes at least one Q-FES 378. The Q-WLAN 377 and the Q-FES 378 may include one or more elements of the illustrative quantum-enabled communication node 220 (FIG. 2B).

Continuing with the illustrative example, the cloud computing environment 375 may include a quantum resource manager (Q-RM) 380. The Q-RM 380 may receive instructions from an SDN controller of the cloud computing environment 375 to provision and/or otherwise associate a quantum channel 379 with a wireless communication link. The example virtualized communication network 300 may include one or more security monitors 381. The security monitor 381 may be implemented in whole or in part according to the cloud computing environment 375, e.g., associated with the virtualized network function cloud 325. Alternatively or in addition, the security monitor 381 may be separate from the cloud computing environment 375, e.g., as a standalone device. The security monitor 381 is adapted to detect a possible breach or security and/or security threat. The security monitor 381 may inform the cloud computing environment 375, e.g., via a SDN controller. The SDN controller, in turn, may implement one or more rules and/or policies to determine whether a perceived threat may require provisioning of a quantum-enabled communication channel. To the extent it is determined that a quantum-enabled communication channel is necessary, the Q-RM 380 coordinates quantum-aware assets, such as one or more of the Q-FES 378 and/or the Q-WLAN 377 to provision the quantum-enabled communication channel.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
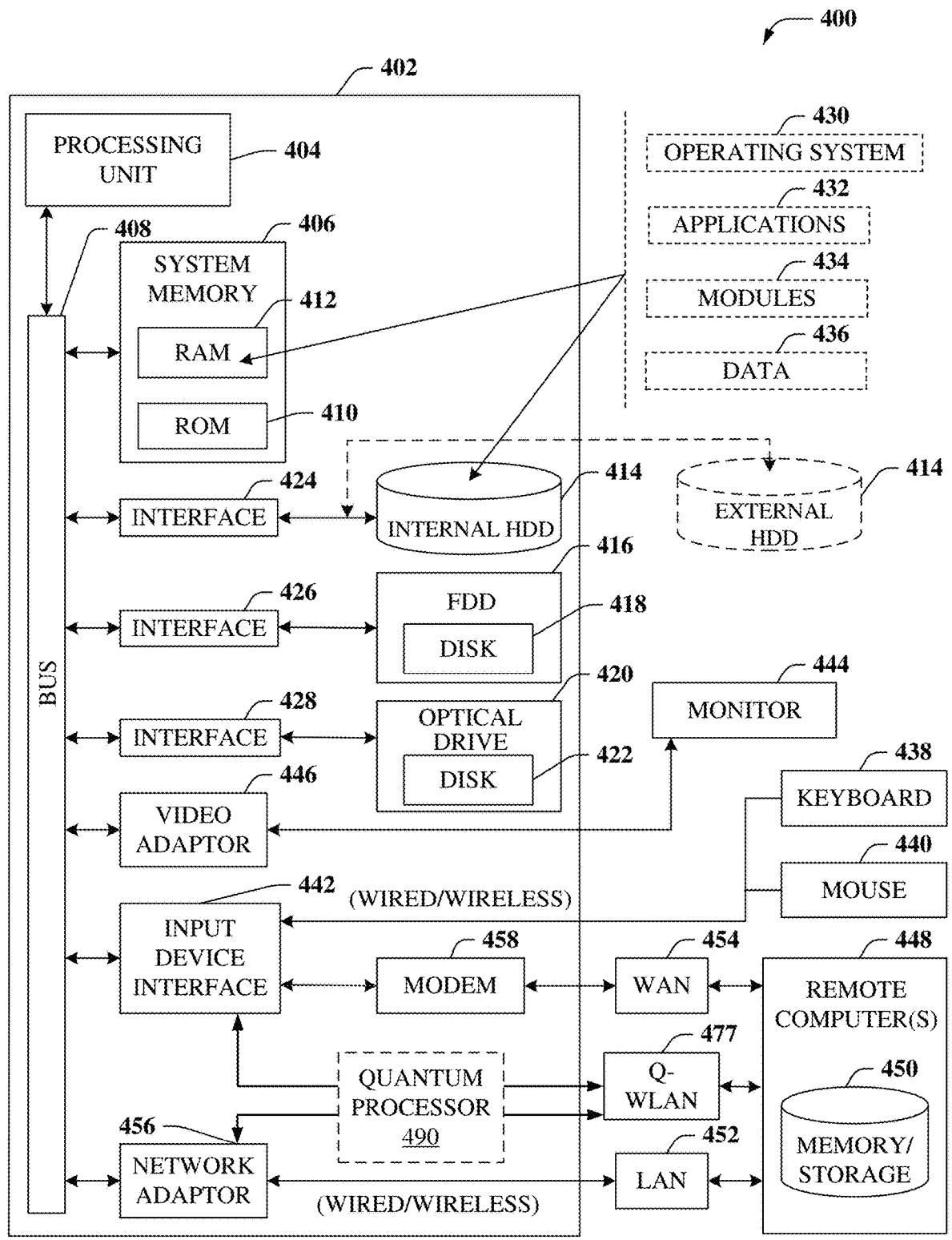
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, the computing environment 400 may facilitate in whole or in part, a provisioning, an establishment and/or an activation of a quantum-enabled communication channel between a wireless access point and a mobile core network responsive to a perceived security threat, and securing mobile backhaul communications according to an exchange of quantum entangled particles via the quantum channel.

Generally, program modules comprise routines, programs, components, data structures, etc., that perform particular tasks or implement particular abstract data types. Moreover, those skilled in the art will appreciate that the processes may be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any process or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example computing environment 400 can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the processes described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and processes described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

The example computer environment 400 includes quantum-aware elements or subsystems adapted to perform computational and/or communication functions based at least in part upon quantum mechanical principles. According to the quantum-aware elements, the computer 402 may include one or more elements of the illustrative quantum-enabled communication node 220 (FIG. 2B). According to the illustrative example, the computer 402 include a quantum processor 490, which may include one or more of a qubit source, an entanglement generator, a quantum processor and/or a qubit detector. Similarly, the example computer environment 400 may include one or more separate quantum-aware network elements. According to the illustrative example, the computer environment 400 includes at least one Q-WLAN 477, which may include one or more elements of the illustrative quantum-enabled communication node 220 (FIG. 2B).

Figure 5:
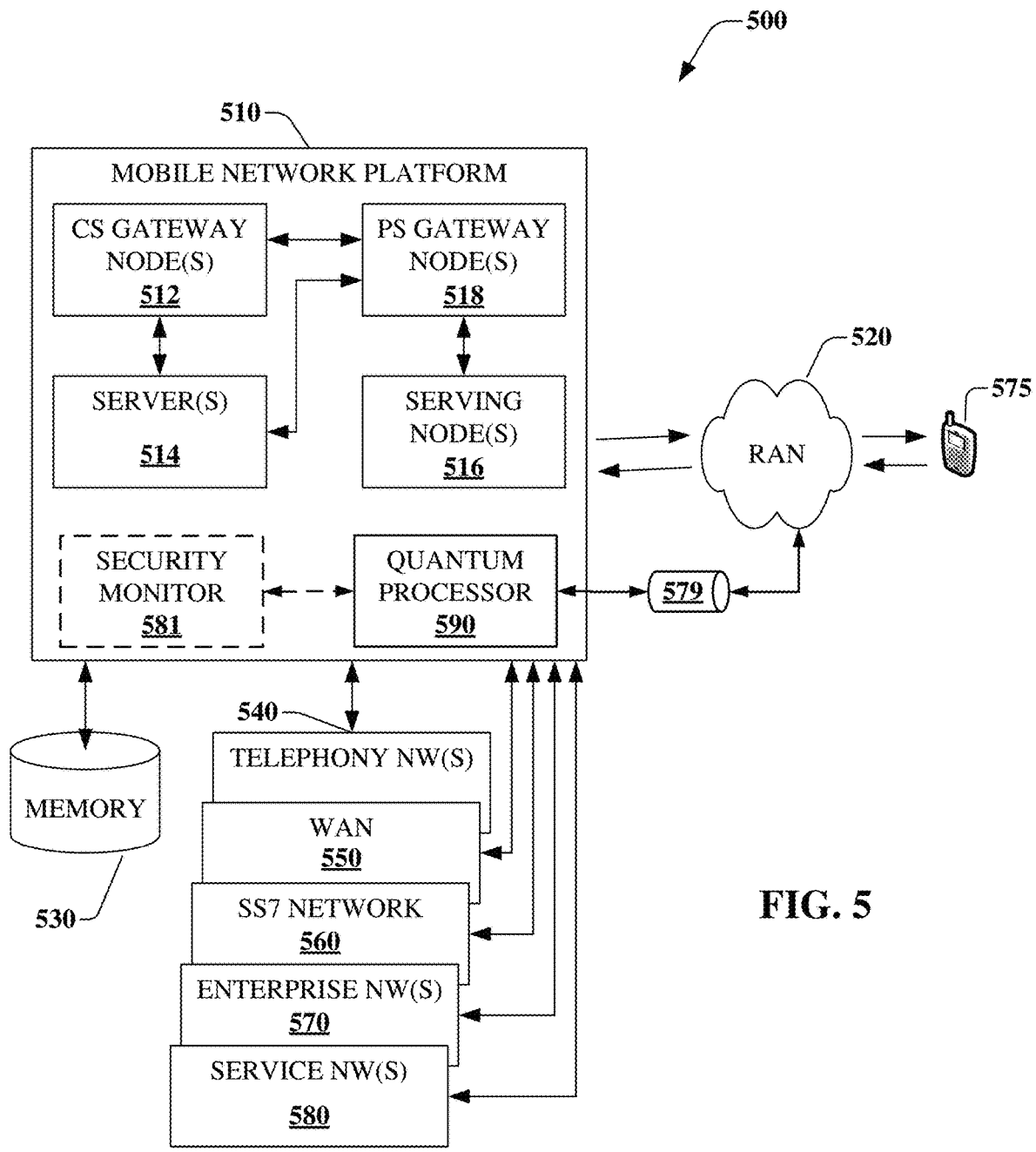
FIG. 5 is a block diagram of an example, non-limiting embodiment of a mobile network platform in accordance with various aspects described herein.

Turning now to FIG. 5, a mobile network environment 500 including an embodiment of a mobile network platform 510 is shown that is an example of network elements 150, 152, 154, 156, and/or VNEs 330, 332, 334, etc. For example, the platform 510 may facilitate in whole or in part may facilitate in whole or in part, a provisioning, an establishment and/or an activation of a quantum-enabled communication channel between a wireless access point and a mobile core network responsive to a perceived security threat, and securing mobile backhaul communications according to an exchange of quantum entangled particles via the quantum channel. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s)

518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flatrate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

The mobile network environment 500 includes quantum-aware elements or subsystems adapted to perform computational and/or communication functions based at least in part upon quantum mechanical principles. According to the quantum-aware elements, the mobile network platform 510 may include one or more elements of the illustrative quantum-enabled communication node 220 (FIG. 2B). According to the illustrative example, the mobile network platform 510 include a quantum processor 590, which may include one or more of a qubit source, an entanglement generator, a quantum processor and/or a qubit detector. Similarly, the example mobile network platform 510 may include one or more separate quantum-aware network elements. In at least some embodiments, the mobile network platform 510 may include a security monitor 581. The security monitor 581 is adapted to detect a possible security breach or threat, which may result in a provisioning and/or use of a quantum-enabled communication channel 579 according to the various techniques disclosed herein.

Figure 6:
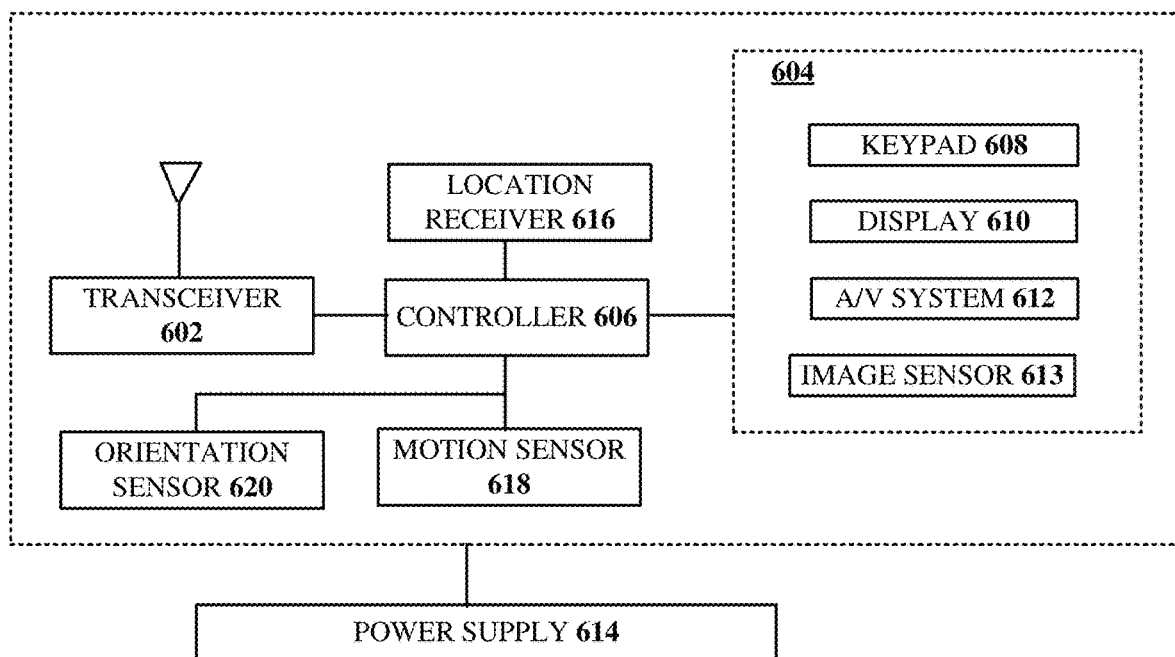
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, the computing device 600 may facilitate in whole or in part, a provisioning, an establishment and/or an activation of a quantum-enabled communication channel between a wireless access point and a mobile core network responsive to a perceived security threat, and securing mobile backhaul communications according to an exchange of quantum entangled particles via the quantum channel.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or processes herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A system, comprising:
a processing system including a processor; and
a memory that stores executable instructions that, when executed by the processing system, facilitate performance of operations, the operations comprising:
monitoring a security status of a mobile communication session comprising a back-haul link between a wireless access point and a mobility core network, the back-haul link comprising a classical communication channel adapted to transport underlying data of the mobile communication session between the wireless access point and the mobility core network;
responsive to determining a change in the security status indicating a perceived threat:
provisioning a quantum communication channel between the wireless access point and the mobility core network, wherein the quantum communication channel is adapted to transport information via qubits; and
exchanging information between the wireless access point and the mobility core network via the qubits of the quantum communication channel, wherein the exchanging of the information via the qubits enhances a security level of the mobile communication session to obtain an enhanced security level in view of the perceived threat.

2. The system of claim 1, wherein the provisioning of the quantum communication channel further comprises:
associating a quantum-enabled communication node with the mobile communication session; and
initiating generation of a quantum-entangled state according to the quantum-enabled communication node, wherein the qubits transported via the quantum communication channel are subject to the quantum-entangled state, wherein the enhanced security level is based on the quantum-entangled state.

3. The system of claim 2, wherein the exchanging of the information between the wireless access point and the mobility core network via the qubits of the quantum communication channel further comprises:
transporting the underlying data of the classical communication channel via teleportation according to the quantum-entangled state.

4. The system of claim 1, wherein the qubits comprise photons.

5. The system of claim 1, wherein the mobility core network facilitates the mobile communication session according to a 3rd Generation Partnership Project (3GPP), long-term evolution (LTE) protocol.

6. The system of claim 5, wherein the underlying data further comprises user data according to user plane operation of the 3GPP, LTE protocol.

7. The system of claim 5, wherein the underlying data further comprises control signaling according to control plane operation of the 3GPP, LTE protocol.

8. The system of claim 1, wherein the monitoring of the security status further comprises receiving an indication of the perceived threat from a threat detector adapted to detect potential threats occurring along the back-haul link.

9. The system of claim 1, wherein the exchanging of the information between the wireless access point and the mobility core network via the qubits of the quantum communication channel further comprises:
sharing an encryption key according to quantum key distribution via the quantum communications channel to obtain a shared key, the underlying data of the classical communication channel being encrypted according to the shared key.

10. A method, comprising:
monitoring, by a processing system including a processor, a security status of a wireless communication session comprising a back-haul link between a wireless access point and a mobility core network, the back-haul link comprising a classical communication channel adapted to transport underlying data of the wireless communication session between the wireless access point and the mobility core network;
responsive to determining a change in the security status indicating a perceived threat:
initiating, by the processing system, a quantum communication channel between the wireless access point and the mobility core network, wherein the quantum communication channel is adapted to transport information via qubits; and
exchanging, by the processing system, information between the wireless access point and the mobility core network via the qubits of the quantum communication channel, wherein the exchanging of the information via the qubits enhances a security level of the wireless communication session to obtain an enhanced security level in view of the perceived threat.

11. The method of claim 10, wherein the initiating of the quantum communication channel further comprises:
associating a quantum-enabled communication node with the wireless communication session; and
initiating generation of a quantum-entangled state according to the quantum-enabled communication node, wherein the qubits transported via the quantum communication channel are subject to the quantum-entangled state, wherein the enhanced security level is based on the quantum-entangled state.

12. The method of claim 11, wherein the exchanging of the information between the wireless access point and the mobility core network via the qubits of the quantum communication channel further comprises:
transporting, by the processing system, the underlying data of the classical communication channel via teleportation according to the quantum-entangled state.

13. The method of claim 10, wherein the qubits comprise photons.

14. The method of claim 10, wherein the mobility core network facilitates the wireless communication session according to a 3rd Generation Partnership Project (3GPP), long-term evolution (LTE) protocol.

15. The method of claim 10, wherein the monitoring of the security status further comprises receiving, by the processing system, an indication of the perceived threat from a threat detector adapted to detect potential threats occurring along the back-haul link.

16. The method of claim 10, wherein the exchanging of the information between the wireless access point and the mobility core network via the qubits of the quantum communication channel further comprises:
sharing, by the processing system, an encryption key according to quantum key distribution via the quantum communications channel to obtain a shared key, the underlying data of the classical communication channel being encrypted according to the shared key.

17. A non-transitory machine-readable medium, comprising executable instructions that, when executed by a processing system including a processor, facilitate performance of operations, the operations comprising:
monitoring a security status of a wireless communication session comprising a back-haul link between a wireless access point and a mobility core network, the back-haul link comprising a classical communication channel adapted to transport underlying data of the wireless communication session between the wireless access point and the mobility core network;
responsive to determining a change in the security status indicating a perceived threat:
associating with the wireless communication session a quantum communication channel between the wireless access point and the mobility core network, wherein the quantum communication channel is adapted to transport information via qubits; and
exchanging information between the wireless access point and the mobility core network via the qubits of the quantum communication channel, wherein the exchanging of the information via the qubits enhances a security level of the wireless communication session to obtain an enhanced security level in view of the perceived threat.

18. The non-transitory machine-readable medium of claim 17, wherein the associating of the quantum communication channel further comprises:
- associating a quantum-enabled communication node with the wireless communication session; and
- initiating generation of a quantum-entangled state according to the quantum-enabled communication node, wherein the qubits transported via the quantum communication channel are subject to the quantum-entangled state, wherein the enhanced security level is based on the quantum-entangled state.

19. The non-transitory machine-readable medium of claim 18, wherein the exchanging of the information between the wireless access point and the mobility core network via the qubits of the quantum communication channel further comprises:
- transporting, by the processing system, the underlying data of the classical communication channel via teleportation according to the quantum-entangled state.

20. The non-transitory machine-readable medium of claim 17, wherein the mobility core network facilitates the wireless communication session according to a 3rd Generation Partnership Project (3GPP), long-term evolution (LTE) protocol.

* * * * *